United States Patent
Rousseau

(10) Patent No.: US 7,218,913 B2
(45) Date of Patent: May 15, 2007

(54) COMPANY TELEPHONE NETWORK

(75) Inventor: Jean-René Rousseau, Neuville S/Oise (FR)

(73) Assignee: Alcatel, Paris (FR)

( * ) Notice: Subject to any disclaimer, the term of this patent is extended or adjusted under 35 U.S.C. 154(b) by 738 days.

(21) Appl. No.: 09/773,729

(22) Filed: Feb. 2, 2001

(65) Prior Publication Data

US 2001/0039186 A1    Nov. 8, 2001

(30) Foreign Application Priority Data

Feb. 4, 2000    (FR) .................................. 00 01421

(51) Int. Cl.
*H04M 11/00* (2006.01)

(52) U.S. Cl. ..................... 455/406; 455/7; 455/445; 370/315

(58) Field of Classification Search ............. 455/426.1, 455/445, 7, 11.1, 13.1, 16, 406; 370/401, 370/226, 243, 246, 274, 279, 293, 315, 316, 370/492, 501, 75, 97; 375/211; 342/15, 342/353

See application file for complete search history.

(56) References Cited

U.S. PATENT DOCUMENTS

| | | | |
|---|---|---|---|
| 5,448,619 A * | 9/1995 | Evans et al. .............. | 455/426.1 |
| 5,459,761 A * | 10/1995 | Monica et al. .............. | 375/211 |
| 6,141,533 A * | 10/2000 | Wilson et al. .............. | 455/11.1 |
| 6,263,061 B1 * | 7/2001 | Tanaka et al. .............. | 379/156 |
| 6,404,775 B1 * | 6/2002 | Leslie et al. .............. | 370/466 |
| 6,418,324 B1 * | 7/2002 | Doviak et al. ............ | 455/426.1 |

FOREIGN PATENT DOCUMENTS

EP          0830042 A       5/1998
WO    WO 99 4545728 A     9/1999

* cited by examiner

*Primary Examiner*—Jean Gelin
*Assistant Examiner*—Nghi H. Ly
(74) *Attorney, Agent, or Firm*—Sughrue Mion, PLLC

(57) ABSTRACT

The invention relates to telecommunication equipment (10) for setting up local telephone calls between GSM mobile telephones (1) of a private network, on the one hand, and a public GSM mobile telephone network (5), on the other hand. The equipment includes connection means to the public network and connection means to each mobile telephone of the private network. For the connection to the public network, it includes a downstream radio access system (3) for access to radio base transceiver stations (5) of the public network. For the link to the mobile telephones (1) of the private network it includes upstream radio access system (2) conforming to the GSM standard, like the public network. The equipment further includes a service signal converter module (4) between the upstream system (2) and the downstream system (3).

14 Claims, 1 Drawing Sheet

COMPANY TELEPHONE NETWORK

BACKGROUND OF THE INVENTION

The invention relates to cellular telephony and more particularly to providing a local service on a private site which has a private local telecommunication network.

Document EP 1 032 225 describes a private telecommunication network including an exchange, landline terminals, DECT mobile terminals, and standard GSM mobile terminals. A server and GSM base transceiver stations enable the GSM terminals to benefit from all the services offered by a private exchange, in particular setting up calls to other terminals on the same private network.

The radio subsystems are generally interconnected by digital links. In the context of a GSM radio subsystem (referred to as a base station system—BSS) protocols that govern signaling exchanged between the BSS and the network are based on the No. 7 signaling system, which is not optimized for connecting sites of small capacity.

SUMMARY OF THE INVENTION

The object of the invention is to connect a private network of the above kind, for example a company network, to a public telecommunication network without using the standard method of connecting a GSM radio subsystem (BSS) to a public network, namely an interface referred to in the GSM terminology as the A interface, generally via a 2 Mbit/s digital link.

The invention provides telecommunication equipment for setting up local telephone connections between at least one mobile telephone belonging to a private network and a public network, the equipment including:
  a downstream radio access system for setting up a downstream link to a base transceiver station of a public mobile telephone network, and
  an upstream radio access system for setting up an upstream link to a mobile telephone of the private network,
  characterized in that the upstream and downstream systems apply the same mobile telephone standard, which is that of the public mobile telephone network,
  and in that it further includes a service signal converter module between the upstream and downstream systems adapted to:
    repeat signals it receives from the upstream and downstream systems and adapt them to suit the characteristics of the downstream and upstream links, respectively, and
    extract from the signaling information specific to the mobile telephones belonging to the private network and used to manage calls between the terminals of the private network and store that information in a local database.

The above equipment acts as a radio repeater which is simplified because the upstream link and the downstream link apply the same protocol, i.e. that of the public mobile telephone network. The equipment is not limited to the radio repeater (signal re-amplification) function, however, because it also interprets BSS AP layers of the GSM protocol so that it can manage two radio links in series: one between the public network and the equipment and the other between the equipment and a mobile telephone terminal. It repeats service signals it receives from the upstream and downstream systems, but adapts them to suit the characteristics of the downstream and upstream links, respectively.

It also acts as a base transceiver station controller or mobile service switching center to enable internal communications within the private network, to which end it extracts from the signaling information that is specific to the mobile telephones belonging to the mobile network and is used to manage calls between the terminals of the mobile network and stores the information in a local database.

The downstream system preferably includes means for simulating mobile terminal links and the upstream system preferably includes means for simulating base transceiver station links.

An advantageous embodiment of the equipment according to the invention includes a plurality of connectors to receive public network subscriber cards.

In one particular embodiment, the downstream system or the converter module includes a plurality of modules for identifying public mobile telephone network users and said converter module chooses one or more identification modules.

The equipment advantageously includes means for choosing the modules used which are controlled in accordance with a criterion related to the user's contract (for example the identity of the operator).

In one embodiment, the converter module detects by means of a database that a mobile telephone terminal user has a contract with the GSM public network and carries out the transfer without using any of the subscriber resources of the downstream system.

The equipment provides a radio link offering the information transport service but some information is exchanged between the GSM terminals (via their SIM card) and the network infrastructure. Seen from the GSM network, the equipment simulates the type of link conventionally used by mobile terminals.

The invention offers terminals of the private network local radio coverage and access to the base transceiver stations of the public network.

The equipment further includes call processing equipment whose function is to interpret requests from terminals and set up calls.

In the case of an external call request, for example, the system can be limited to the repeater function.

In a different situation, the same system could assume responsibility for the call and process it accordingly (for example by routing the call to a fixed network or setting up a call to another mobile).

In this context, the system is seen by the terminal as a standard BSS but is seen by the radio subsystem BSS of the public network as one or more terminals.

The equipment offers a solution that is optimized for connecting small capacity sites. It offers terminals on the company site all the services available on the public network, via the radio link, and welcomes visitors to the company site, using it as a repeater.

It also enables the whole of the company to move to a new location without modifying the infrastructure network. This is particularly useful in the context of temporary events such as exhibitions.

When a cellular radio system is set up in a company to offer a local service and access to the outside world via the cellular network, a direct link is used to connect a base transceiver station or BSS. That link uses protocols of the cellular network defined between the fixed equipment units. The invention offers an identical service with the further facility to move the company's entire installation.

BRIEF DESCRIPTION OF THE DRAWING

The invention will be better understood after reading the following description, which refers to a non-limiting embodiment of the invention and to the accompanying drawing, in which the single FIGURE (FIG. 1) is a block diagram of an installation according to the invention.

DETAILED DESCRIPTION OF THE INVENTION

Figure 1:
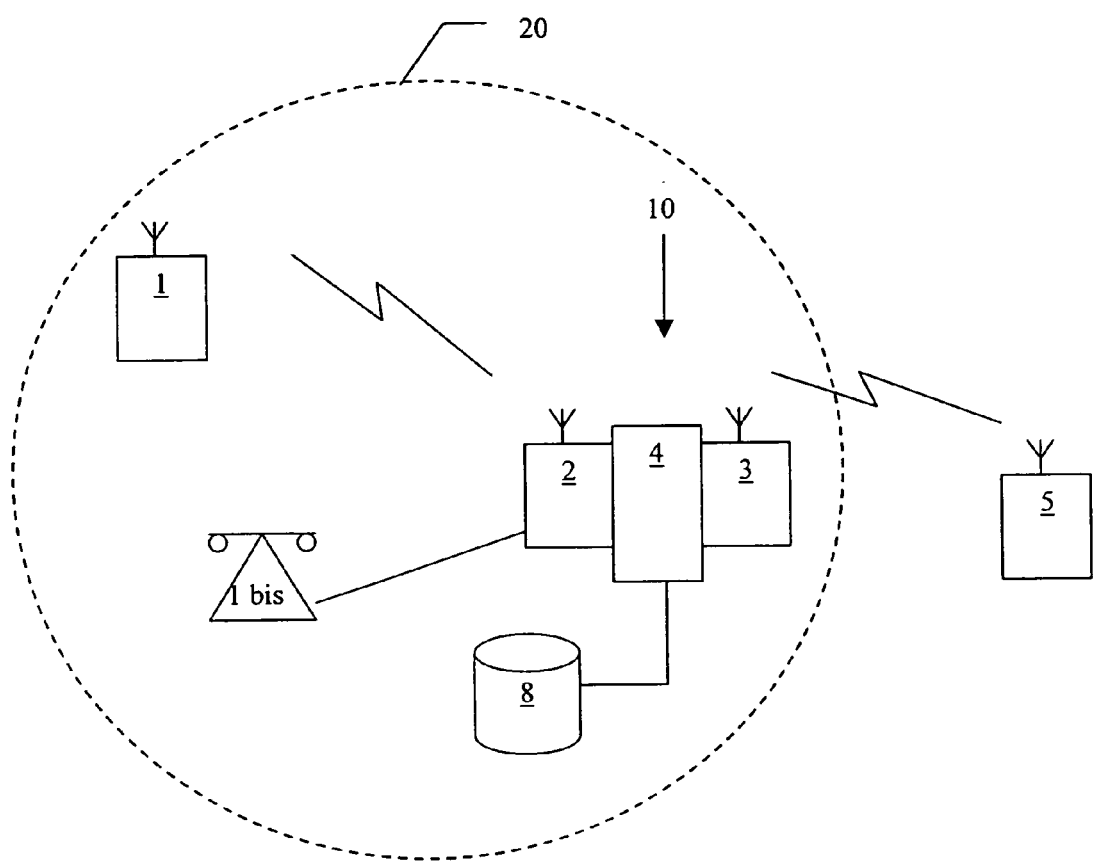

The equipment 10 in accordance with the invention is for setting up links with standard cellular telephones 1, for example GSM telephones, landline telephones 1bis, and possibly DECT cordless telephones, not shown, within the perimeter 20 of a private site, for example an exhibition hall.

The equipment 10 includes:
- an upstream system 2 including a radio transceiver and electronic circuits for setting up upstream GSM links with local GSM cellular telephones 1,
- a downstream system 3 including a radio transceiver and electronic circuits for setting up a downstream GSM link with the base transceiver station 5 of the public GSM network, and
- a signal converter module 4.

Communication between the mobile telephone 1 and the upstream system 2 of the equipment 10 uses a protocol similar to that used to set up and maintain a link between a cellular telephone and a base transceiver station BTS of the GSM public mobile telephone network.

The signals exchanged between the mobile telephone 1 and the upstream system 2 include service signals specific to the standard implemented, which is the GSM standard in this example, in particular parameters, such as an identifier of the mobile telephone 1, an identifier of the user, and values measured by the mobile telephone (level and quality of reception of signals transmitted by the base transceiver stations BTS). The service signals include in particular, in the case of the GSM standard or the DCS, PCS, UMTS standards based on the GSM standard:
- the type of call (outgoing call from the mobile or incoming call received by the mobile),
- on-hook or off-hook call,
- nature of the call (voice or data),
- class of mobile (maximum transmit power),
- user identifier (IMSI—international mobile subscriber identifier, TMSI—temporary mobile subscriber identifier),
- mobile telephone identifier (IMEI—serial number),
- channel and sub-channel numbers,
- timing information such as transmit timing advance,
- information relating to signals received by the base transceiver station,
- the average power at which the signal from the mobile telephone is received by the base transceiver station over the whole of the period that has elapsed since the last power value was supplied,
- the average power at which the signal from the mobile station is received by the base transceiver station over part of the period that has elapsed since the last power value was supplied,
- whether discontinuous transmission (DTX) is used in the BTS to MS direction to suppress periods of silence during a call, and
- network information such as handover, call interruption in response to a problem, etc.

The information is extracted from the service signals and stored by the upstream system 2 to form the descriptor of a local call.

The information is extracted by a signaling capture and processing card (not shown). In the case of a GSM network, the information is set out in the following ETSI specifications: "Mobile Radio Interface Layer 3 specification GSM 04.08", "BSC-BTS Layer 3 specification GSM 08.58", "Radio Sub-system Link Control GSM 05.08" and "Radio Transmission and Reception GSM 05.05".

The signaling capture and processing card processes the signaling in order to format it for use by the converter module 4. The information includes the identifiers of the mobile telephone, radio parameters from which location information is derived, the called number, etc. The converter module 4 uses the information in particular to construct the downstream link between the base transceiver station 5 for the site 20 and the downstream system 3. It adds information stored in a local database 8, for example the terminal equipment identity (TEI).

In the same way, the downstream system 3 and the base transceiver station (BTS) 5 exchange service signals conforming to the GSM standard and therefore similar to those referred to above. However, the values of the service signals of the upstream link and the values of the service signals of the downstream link are not identical. The signals are stored and processed by the converter module 4 to adapt them before forwarding them from one link to the other. For example:
- The timing advance is different for the two links because they are not the same length.
- The transmit power negotiation does not yield the same power values for the two links because the two links are different, in particular because they are different lengths.
- The class of terminal 1 is not the same as that of the transmitter of the downstream system 3.
- On the downstream link, it is necessary to manage any change of base transceiver station if the downstream link can be set up via different base transceiver stations 5, depending on transmission conditions. This change does not affect the upstream link.
- The transmit-receive frequency pairs are different for the two links.
- The cell identifiers are different for the two links.

The converter module 4 therefore acts as a radio repeater but adapts the service signals to suit the physical characteristics specific to each of the upstream and downstream radio links.

The converter module 4 extracts information specific to the mobile telephone 1 of the private network from the service signals and stores the information in the local database 8. The information includes, for each GSM terminal in the private network:
- Location information.
- The temporary mobile subscriber identifier TMSI.
- The encryption key Kc.
- The authentication key Ki.
- The result Sres of a calculation performed in the public network to authenticate the
- The identity of the algorithms used for encryption and authentication.

The information is used by the downstream system 2 to set up local calls between the mobile telephones 1 of the private network.

The invention claimed is:

1. Telecommunication equipment for setting up local telephone connections between at least one mobile telephone, belonging to only a private network, and a public network, the equipment comprising:
 a downstream radio access system for setting up a downstream link to a base transceiver station of a public mobile telephone network, and
 an upstream radio access system for setting up an upstream link to a mobile telephone of the private network,
 wherein:
  the upstream system and the downstream system apply the same mobile telephone standard, which is that of the public mobile telephone network, the equipment further comprising a service signal converter module between the upstream system and the downstream system adapted to:
   repeat signals received from the upstream and downstream systems, and adapt the received signals to suit the characteristics of the downstream and the upstream link, respectively, and
   extract from the signaling information specific to the mobile telephones belonging to the private network and used to manage calls between the terminals of the private network and store that information in a local database,
  the downstream system or the converter module further comprising a plurality of modules for identifying public mobile telephone network users, and
  the converter module further comprising means for choosing one or more modules for identifying public mobile telephone network users in accordance with a criterion related to a contract of the user.

2. Telecommunication equipment according to claim 1, wherein the downstream system comprises means for simulating mobile terminal links.

3. Telecommunication equipment according to claim 1, wherein the upstream system comprises means for simulating base transceiver station links.

4. Equipment according to claim 1, wherein the converter module comprises means for:
 detecting, by means of a database, that the user of a mobile telephone terminal has a contract with the GSM public network and
 carrying out transfer without using any of the subscriber resources of the downstream system.

5. Equipment according to claim 1, wherein the upstream system further comprises means for connecting a DECT or landline telephone.

6. The telecommunication equipment according to claim 1, wherein said upstream system comprises a radio transceiver and electronic circuits, and wherein said radio transceiver and said electronic circuit set up upstream GSM links with at least one local GSM cellular telephone.

7. The telecommunication equipment according to claim 1, wherein said downstream system comprises a radio transceiver and electronic circuits, and wherein said radio transceiver and said electronic circuits set up a downstream GSM link with a base transceiver station of the public GSM network.

8. The telecommunication equipment according to claim 1, wherein said information extracted from the signaling comprises:
 a type of a call, wherein the type of the call comprises one of an outgoing call from a mobile and an incoming call received from a mobile;
 a nature of a call, wherein the nature of the call comprises voice or data; and
 a user identifier, wherein the user identifier comprises an international mobile subscriber identifier or a temporary mobile subscriber identifier.

9. The telecommunication equipment according to claim 1, wherein said information extracted from the signaling forms a descriptor of a local call.

10. The telecommunication equipment according to claim 1, wherein said information extracted from the signaling is extracted from the signaling by a signaling capture and a processing card, and wherein said signaling capture and said processing card process the signaling in order to format it for use by said service signal converter module.

11. The telecommunication equipment according to claim 1, wherein said information stored in the local database comprises:
 a location information;
 a temporary mobile subscriber identifier;
 an encryption key;
 an authentication key;
 a result of a calculation performed in the public network to authenticate a user; and
 an identity of algorithms used for encryption and authentication.

12. Telecommunication equipment according to claim 1, wherein the upstream system further comprises means for connecting a landline telephone.

13. Telecommunication equipment according to claim 1, wherein said information extracted from the signaling comprises a user identifier, wherein the user identifier comprises an international mobile subscriber identifier.

14. Telecommunication equipment according to claim 1, wherein said information extracted from the signaling comprises a user identifier, wherein the user identifier comprises a temporary mobile subscriber identifier.

* * * * *